E. MARSLAND.
Liquid-Meter.
No. 164,852.
Patented June 22, 1875.
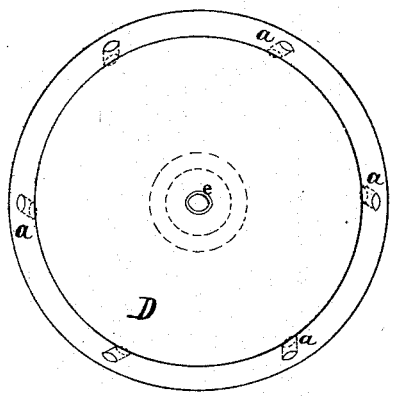
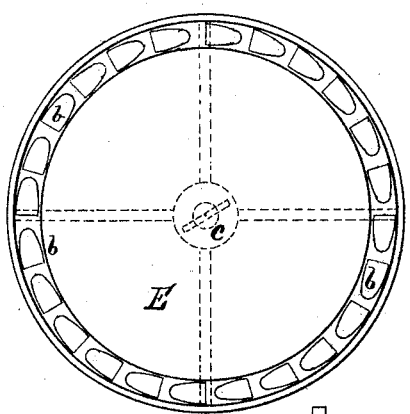
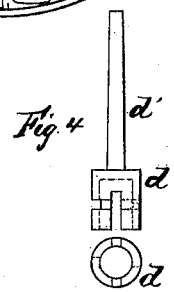
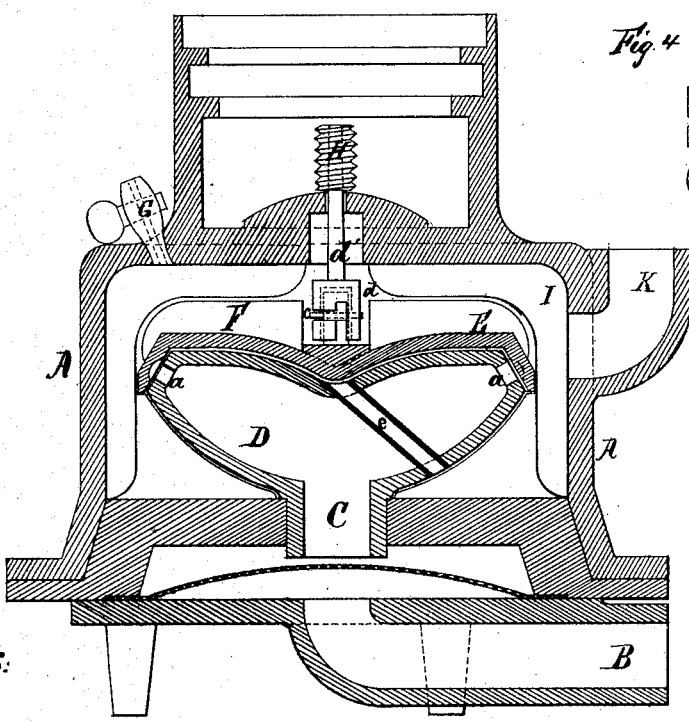
WITNESSES:
Hal Allaire
INVENTOR.
Edward Marsland
by Cochran & Malcomson
his Attorneys

UNITED STATES PATENT OFFICE.

EDWARD MARSLAND, OF SING SING, NEW YORK.

IMPROVEMENT IN LIQUID-METERS.

Specification forming part of Letters Patent No. 164,852, dated June 22, 1875; application filed September 12, 1874.

*To all whom it may concern:*

Be it known that I, EDWARD MARSLAND, of Sing Sing, in the State of New York, have made certain new and useful Improvements in Liquid-Meters; and I do hereby declare the following to be a full and clear description of the same, reference being had to the accompanying drawings, in which—

Figure 1 is a vertical central section of a liquid-meter, showing my improvements. Fig. 2 is a top view of the discharge chamber or compartment D. Fig. 3 is a view of the under side or bottom of the revolving wheel or float E, and Fig. 4 is a detached view of my improved mechanism for coupling the revolving wheel or float with the registering apparatus.

The letters indicate the same parts in the different figures.

This invention relates to that class of liquid-meters described in Letters Patent granted to me on the 21st day of May, 1872; and consists in certain improvements that I have since made upon said meter, by means of which a more perfect registry is made of the amount of liquid passing through the meter, and the registering apparatus is less affected by any change in the pressure or volume of liquid, but will register as correctly when there is a very slight pressure as when there is a heavy pressure or large volume of liquid passing through the meter. Another object of this invention is to prevent the rod connecting the revolving wheel of the meter with the registering apparatus from being thrown out of place by any sudden change in the pressure of liquid, and also the providing of an escape for any sediment that may collect upon the seat of the revolving wheel.

In the drawings, A represents the shell or outer casing of the meter. B is an inlet-pipe, through which the liquid passes into the meter, and is thence conducted through the pipe C to the distributing-chamber D, out of which it is discharged through the holes $a\ a$, placed around the periphery of the compartment D, which holes have a radial inclination, as shown in Fig. 2. On the top of the compartment D, and closely fitting upon it, is the convex-shaped revolving float E, which has indentations $b\ b$ placed around its circumference, on the inner or under side, and may also have fans or wings F upon its upper surface. On the center of the float or wheel E is placed a pin and cross-bar, $c$, over which the sleeve or hollow end $d$ of the rod $d'$ is slipped, and lateral slots are cut half-way round the sleeve, which allow the cross-bar to couple the rod to the float E, while at the same time the float is not confined by any rigidity of motion, and by reason of the cross-bar resting in the lateral slots the weight of the float will draw the connecting-rod $d$ down, when it falls into position, and prevent it being detached.

In this style of liquid-meter it has been found almost impossible to measure correctly the quantity of water passing through the meter when the pressure is increased and diminished from time to time; and after careful experiments I have discovered that this uncertainty is occasioned by the presence of air in the upper chamber of the meter, and in order to overcome this difficulty I provide the upper compartment with a small vent or escape tube, G, having a valve or cock sufficiently large to discharge all air that may collect in the upper portion of the case A; or a screw may be tapped into the case A for this purpose. H is the registering apparatus, of any desired pattern, and is connected with the float E by the rod $d'$.

In the center of the concave top of the compartment D I place a small tube, $e$, which will carry away all dirt or sediment that may collect at that point, as it is desirable that the wheel or float E should sit snugly on the top of the compartment D.

The operation of this meter is similar to the operation of the one patented by me May 21, 1872, the present improvements being designed to facilitate the more perfect working of its several parts without changing the general plan of the meter, I having found by experiment that these improvements were vitally important in order to produce a perfect working meter.

What I claim as new, and desire to secure by Letters Patent, is—

1. A liquid-meter having its case A provided with a vent-tube, G, in combination with the chamber D and revolving disk E, having wings F, substantially as and for the purpose shown and described.

2. A liquid-meter provided with a tube, $e$, to carry off all sediment from under the float E, substantially as shown and described.

3. A liquid-meter having the rod $d'$ connecting with the registering apparatus, coupled or connected with the float E by means of a cross-bar, $c$, and sleeve $d$, in which there are vertical and lateral slits or slots, substantially as shown and described.

EDWARD MARSLAND.

Witnesses:
ROBT. JENKINS,
A. BELL MALCOMSON, Jr.